June 20, 1950     H. POSS     2,512,469
METHOD OF PATCHING
Filed Sept. 7, 1944
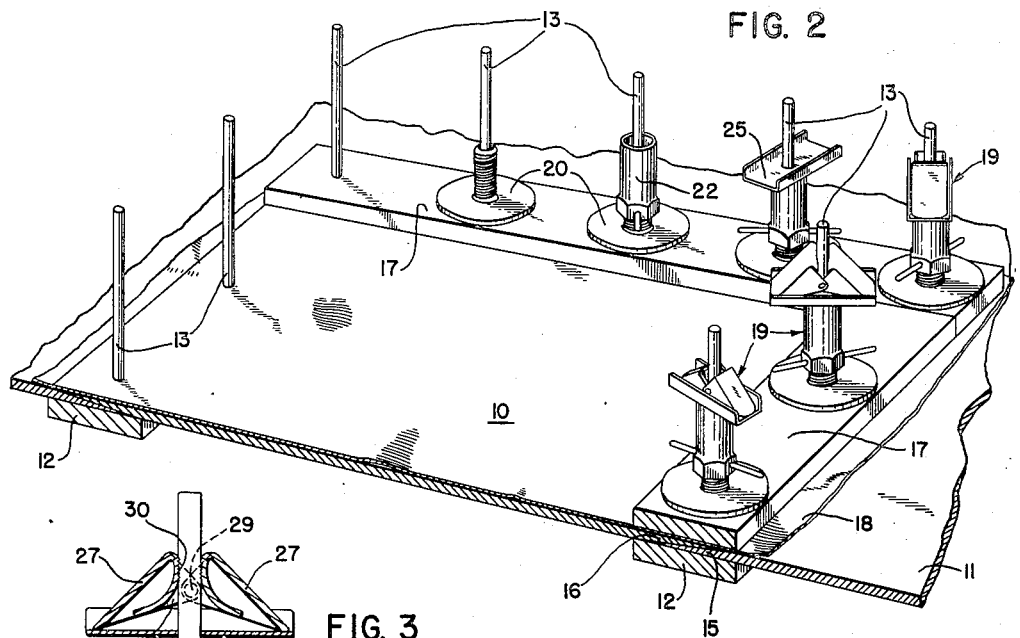
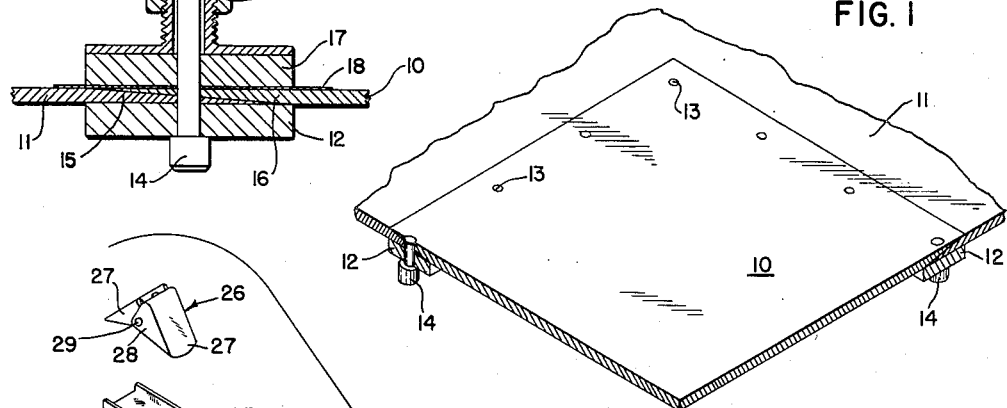
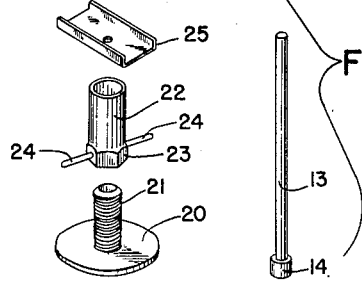
INVENTOR.
HARVEY POSS
BY
ATTORNEY Patented June 20, 1950

2,512,469

UNITED STATES PATENT OFFICE 2,512,469

METHOD OF PATCHING

Harvey Poss, St. Matthews, Ky., assignor to Curtiss-Wright Corporation, a corporation Application September 7, 1944, Serial No. 553,078

4 Claims. (Cl. 154—104)

This invention is directed to a method of patching and repairing generally, and applies more specifically to a method for applying patches of a nature particularly adapted for repairing holes or minor damages in sheet material or surface coverings.

The invention is capable of use in the art of repairing and patching punctures, perforations, tears, holes and the like in tanks, hulls of boats, pontoons, in the skin coverings of airplanes, flying boats or fuselage and wing surfaces and is particularly well suited for use in places ordinarily inaccessible from the inside.

A primary object is the method of patching comprising generally the steps of preparing a hole or other aperture for receiving a repair patch, fitting the patch material in its intended position and reinforcing and permanently securing the patch in place so that the finally repaired surface is restored to its original strength and outward appearance.

A further object of this invention is to provide a method of blind patching, that is a method of patching a hole or puncture in a skin surface where the entire operation is most conveniently performed from the outside or exposed surface.

Still another object is to devise a method of placing, clamping and compressing a surface patch in position and at the same time provide for the ready removal of certain of the clamping and compressing means without affecting the patching work or requiring that the patched zone of the work be accessible from both sides.

The nature and scope of the invention will be better understood from the detailed description about to be given in connection with the accompanying drawings in which:

Figure 1 is a fragmentary perspective view of a patched skin surface and in which the patch has been applied in accordance with the method hereof, Figure 2 is another perspective view of a skin patch in process of application, Figure 3 is an enlarged sectional elevation of a patch joint which is being held under compression by the use of the clamping devices herein preferred, and Figure 4 is a detail view of a clamping device with the several parts and elements thereof shown when disassembled.

The present invention is illustrated in the accompanying drawings and in Figure 1 of which there is shown a patch 10 which has been completely set in place in a surrounding sheet covering or other surface material 11 and which is held permanently in place by a suitable glue or other bonding material applied on the contacting surfaces of a scarf joint formed between the patch and the adjacent sheet material. One of the important features of the present invention resides in the fact that a patch of the nature herein contemplated is further strengthened by means of backing strips 12 permanently secured along the joint area of the patch and held in place not only with glue or other bonding compound but by the addition of a series of spaced dowel pins 13, each of which is inserted in a suitable aperture with a head portion 14 brought into contact with the under surface of the backing strips. A study of Figure 1 will show the features of this invention as above noted.

In Figure 2 there is illustrated the several steps of a preferred method for carrying out the patching of boat hulls, aircraft fuselage skins and the like. It is contemplated herein that the patch be set in place from one side of the skin or sheet material 11 in the following manner. The margin or lip portion of the damaged skin is first tapered or beveled as at 15 and in like manner the matching lip portion of the patch 10 is tapered or beveled as at 16 so that the patch will lie flush with the general exterior surface of the sheet or skin 11. Suitable backing strips 12 are then inserted through the open area to be patched and are positioned along the marginal under surface of the sheet 11. These strips are held in this position by means of the dowel pins 13, each of which is adapted to project considerably above the face plane of the sheet 11. The patch 10 is then perforated around its lip edge 16 and placed in position by sliding the same over the dowel pins.

With this much of the patching process completed, glue or any other suitable bonding agent may then be applied to the tapered or beveled joint formed between the patch 10 and sheet 11 as well as on the surfaces of the backing strips 12 which lie adjacent the under surface of the sheet 11. Furthermore, this same bonding agent or glue is applied to the portions of the dowel pin confined or buried in the backing strips 12 and patch 10 and sheet 11, respectively. Following the application of the glue, compression pads 17 are then positioned over the dowel pins so that they overlie or are in registry with the backing strips before mentioned. If these pads tend to stick to the patch it may be necessary to lay a sheet of cellophane or other material 18 over the patch surface. A series of clamp devices 19, later to be described, are then disposed over the dowel pins and by suitable manipulation of these clamps a compression load is exerted on the patch joint to render the gluing or bonding agent more effective as is well understood. The clamps 19 and the compression pads 17 may be removed after the glue or bonding agent has completely set. Following the removal of these parts, the portions of the dowel pins which project above the surface of the patch may then be severed or otherwise cut off so that the end faces thereof lie flush with the surface of the patch or sheet material. The final form of the patch is clearly shown in Figure 1.

Referring now in detail to Figures 3 and 4 there is illustrated a form of clamping device 19 which may be employed in carrying out the above described method of patching sheet material. In Figure 4, for example, the clamp is shown as comprising a pad or foot plate member 20 formed with an upstanding and centrally disposed tubular portion 21 which has been threaded on its exterior surface. For cooperation with the threaded portion 21 of the foot plate there is provided a tubular torque element 22 having an interiorly threaded portion 23 which is adapted to be threaded on to the portion 21. Suitable finger grip elements or wing rods 24 project laterally on opposite sides of the threaded or nut-like element 23 and are provided to facilitate the rotation of torque element 22. In addition a saddle plate 25 of a generally shallow channel section is provided to receive and support on the upper end of the torque element a clamp jaw device 26. The clamp jaw device includes a pair of jaw elements 27 each of which may be formed from sheet material or may be cast to the shape desired. Each of these jaws 27 is provided with a pair of forwardly projecting ears 28 by means of which laterally spaced and suitable pivotal connection may be formed by means of a pair of stub shafts 29 secured in position in the usual manner as by peening the end thereof to form a holding flange. In addition, each of the jaw elements 27 is provided with a suitably roughened or serrated working surface 30 so that the outer or shank portion of the dowel pin which passes through the jaw throat (Figure 3) may be gripped and retained therein upon oppositely pivotally actuating the jaw elements 27.

In Figure 3 the clamping device has been shown in detail. For example, the clamp foot plate 20 assumes a position over the upstanding portion of the dowel pin 13. The thimble or torque element 22 is then threaded downwardly over the portion 21 to a suitable position as shown. The saddle plate 25 is positioned on top of the thimble 22 and is retained in this position by the dowel pin 13 passing through a suitable aperture formed in its base surface, and the clamping member 26 is then positioned on the saddle in position to grip the dowel pin 13. With the clamp parts thus assembled, the lap joint 15—16 between the sheet material 11 and the patch 10 may be subjected to compression by outwardly threading the torque element 22, the outward movement of which acts to draw the dowel pin head portion 14 against the backing strip 12 and at the same time to move the foot plate 20 toward the compression pad 17 thereby subjecting the interposed patch and sheet material to the desired compressive force.

Once the glue or bonding agent has set satisfactorily the clamps may be removed together with the compression pads 17. The upstanding portions of pins 13 are then cut off flush with the face surface of the patch so that the finished patch appears as shown in Figure 1.

The advantage of this method of patching lies in the fact that the patch joint is adequately and permanently reinforced by the presence of the underlying or backing strips. The dowel pins remaining in the patch also contribute to the strength of the patch joint and are considerably more advantageous than the employment of nails or similar securing elements heretofore employed in patching and repairing. Other advantages will become evident from a study of the above detailed description.

The above described method for patching and repairing may be found especially useful in the repair of wood panels, ply-wood skin sections of aircraft, wood boat hulls and the like. With certain modifications the method may also be applied to the patching of metal sheets and coverings. Therefore, it should be understood that the scope of the present invention shall not be limited except to the extent required by the claims here appended.

What is claimed is:

1. In the method of setting an overlapping patch in place in a surface covering, the steps of permanently reinforcing with backing strips the opposite side of the overlapping area to be patched, further permanently strengthening the patch by means of a series of spaced headed dowel pins, each dowel pin being passed outwardly through the backing strips and the overlapped patch and covering to cause the heads of the pins to contact said backing strips, temporarily reinforcing outer face of the patch by means which are guided into position over the outwardly projecting ends of dowel pins, exerting inwardly directed compressive forces against the temporary reinforcing means with the outward reactions of said forces being exerted upon said outwardly projecting portions of the dowel pins to thereby compress the patch between the backing strips and said temporary reinforcing means to secure a firm bond between the patch and the covering upon the application of a bonding agent to the contacting surfaces therebetween, and finally removing said temporary reinforcing means and severing the dowel pins at the face of the patch, whereby the face area of the patch is left smooth while the backing strips are securely anchored in position by the dowel pin portions remaining in the patch.

2. In the method of setting a patch in place as described in the preceding claim and in which the dowel pins are gripped by clamping means which are extended in a direction axially of the pins to apply said inwardly directed compressive forces against the temporary reinforcing means.

3. A method of patching a perforated surface which comprises preparing the marginal edges of the perforation to receive a patch in overlapped relation, positioning backing strips along the opposite margins of the perforation, retaining the backing strips in position by a series of outwardly projecting dowel pins provided with means to engage the exposed surface of said backing strips, utilizing the projecting portions of the dowel pins to guide a previously prepared patch into overlapping position over said marginal edges, exerting inwardly directed compressive forces along the patch margins with the outward reactions of said forces being exerted upon the dowel pin projections, thereby to secure a permanent bond along the patch margins after the application of a bonding agent therebetween, and thereafter severing the dowel pin projections flush with the patch to present a smooth patched surface which is reinforced by the presence of the backing strips and dowel pins.

4. A method of patching a perforated surface which comprises preparing the marginal edges of the perforation to receive a patch by scarfing the edge portions around the perforation, positioning backing strips to underlie said edge portions, retaining the backing strips in position by a series of outwardly projecting dowel pins having means to engage the under surfaces of said backing strips, utilizing the projecting portions of the dowel pins to guide a previously prepared marginally scarfed patch into recessed position over the perforation, exerting inwardly directed compressive forces along the patch margins with the outward reactions of said forces being exerted upon the dowel pin projections, thereby to secure a permanent bond along the patch margins after the application of a bonding agent therebetween, and, subsequently to setting up of said bonding agent, severing the dowel pin projections flush with the patch to present a smooth patched surface which is reinforced by the presence of the backing strips and dowel pins.

HARVEY POSS.

REFERENCES CITED

The following references are of record in the file of this patent:

UNITED STATES PATENTS

| Number | Name | Date |
|---|---|---|
| 863,650 | Rockwell | Aug. 20, 1907 |
| 1,552,954 | Rockwell | Sept. 8, 1925 |
| 1,938,816 | Eger | Dec. 12, 1933 |
| 2,094,779 | Donaldson | Oct. 5, 1937 |
| 2,102,558 | Johnson | Dec. 14, 1937 |
| 2,136,875 | Blanc | Nov. 15, 1938 |
| 2,263,536 | Dike | Nov. 18, 1941 |
| 2,395,656 | Chatfield | Feb. 26, 1946 |